(12) United States Patent
Sawada

(10) Patent No.: US 9,042,943 B2
(45) Date of Patent: May 26, 2015

(54) TV PHONE APPARATUS AND CONTROL METHOD THEREFOR

(71) Applicant: NEC Casio Mobile Communications, Ltd., Kawasaki-shi, Kanagawa (JP)

(72) Inventor: Masaki Sawada, Kanagawa (JP)

(73) Assignee: NEC CASIO MOBILE COMMUNICATIONS LTD., Kanagawa (JP)

( * ) Notice: Subject to any disclaimer, the term of this patent is extended or adjusted under 35 U.S.C. 154(b) by 159 days.

(21) Appl. No.: 13/765,011

(22) Filed: Feb. 12, 2013

(65) Prior Publication Data

US 2014/0225975 A1     Aug. 14, 2014

(51) Int. Cl.
| | | |
|---|---|---|
| H04M 1/00 | (2006.01) | |
| H04M 1/725 | (2006.01) | |
| H04N 13/00 | (2006.01) | |
| H04N 13/02 | (2006.01) | |

(52) U.S. Cl.
CPC ............ *H04M 1/725* (2013.01); *H04N 13/0059* (2013.01); *H04N 13/0239* (2013.01); *H04N 13/0289* (2013.01); *H04N 13/0296* (2013.01)

(58) Field of Classification Search
None
See application file for complete search history.

(56) References Cited

U.S. PATENT DOCUMENTS

| | | | | |
|---|---|---|---|---|
| 6,665,002 | B2* | 12/2003 | Liu ............................ | 348/14.12 |
| 2005/0180338 | A1* | 8/2005 | Pirila et al. .................... | 370/252 |
| 2010/0323609 | A1* | 12/2010 | Aramaki ...................... | 455/3.01 |
| 2012/0229601 | A1* | 9/2012 | Doi et al. ........................ | 348/43 |
| 2013/0165186 | A1* | 6/2013 | Choi ............................. | 455/566 |
| 2014/0002616 | A1* | 1/2014 | Ohba et al. ...................... | 348/47 |
| 2014/0135072 | A1* | 5/2014 | Sawada ......................... | 455/566 |

FOREIGN PATENT DOCUMENTS

| | | | |
|---|---|---|---|
| JP | 2001-274742 | A | 10/2001 |
| JP | 2004-032804 | A | 1/2004 |
| JP | 2007-295517 | A | 11/2007 |
| JP | 2010-141447 | A | 6/2010 |

* cited by examiner

*Primary Examiner* — Maria El-Zoobi
(74) *Attorney, Agent, or Firm* — Sughrue Mion, PLLC

(57) ABSTRACT

Wireless circuit 201 performs transmission and reception of communication data. Cameras 204 and 205 take two moving images with different parallaxes and output two pieces of moving image data. Voice input/output section 202 acquires voice and outputs voice data. CPU 206 transmits multiple pieces of moving image data and voice data via wireless circuit 201, and, when the reception quality of communication data becomes equal to or below a reference value, stops at least one of cameras 204 and 205 to stop transmission of at least one of the multiple pieces of moving image data.

6 Claims, 8 Drawing Sheets

TV PHONE APPARATUS AND CONTROL METHOD THEREFOR

BACKGROUND OF THE INVENTION

1. Field of the Invention

The present invention relates to a TV phone apparatus and a control method therefor.

2. Description of the Related Art

In comparison with a conventional voice telephony apparatus only for making a voice phone conversation, a common TV phone apparatus requires a faster data transmission rate because of the larger amount of transmission at the time of a phone conversation. Furthermore, when a sufficient data transmission rate cannot be obtained because of the radio wave condition, problems are caused, such as disturbance of images displayed on the TV phone apparatus and disconnection of a phone conversation.

In comparison, JP2001-274742A and JP2004-32804A disclose techniques in which, when the data transmission rate becomes below a predetermined value, transmission and reception of video image data are stopped, and only a voice phone conversation by voice data is made.

Recently, attention has been focused on 3-D video image techniques such as a 3-D camera that takes a three-dimensional stereoscopic video image (hereinafter referred to as a 3-D video image) and a 3-D display that displays a 3-D video image.

The 3-D display causes a viewer to visually confirm a three-dimensional stereoscopic video image by displaying multiple video images with different parallaxes in turn or by displaying multiple video images with different parallaxes at the same time by changing the display angle. The 3-D camera is provided with multiple image-taking means, and takes multiple video images with different parallaxes as a 3-D video image using each of the image-taking means.

As a technique in which a 3-D video image technique is applied to a TV phone apparatus, there is a camera-equipped mobile information terminal described in JP2010-141447A. This camera-equipped mobile information terminal makes it possible to make a phone conversation with a phone conversation counterpart while seeing a 3-D video image, by transmitting 3-D video image data indicating a 3-D video image taken by a 3-D camera in real time together with voice data.

However, in a 3-D TV phone apparatus that transmits 3-D video image data like the camera-equipped mobile information terminal described in JP2010-141447A, it is necessary to cause the multiple image-taking means to operate at the same time, perform video image processing on multiple video image signals and increase the frame rate of the display image.

Therefore, in the 3-D TV phone apparatus, the amount of the operation of internal devices, such as a camera, a display and a CPU (Central Processing Unit), increases in comparison with a conventional 2-D TV phone apparatus that transmits a two-dimensional plane video image (hereinafter referred to as a 2-D video image), and, consequently, noise caused in the internal devices increases.

The transmission rate at the time of a phone conversation is influenced by noise. Therefore, when noise caused in the internal devices increases, a problem occurs that, especially in an environment with a bad radio wave condition, a sufficient data transmission rate cannot be obtained, and a phone conversation is easily disconnected.

In the techniques described in JP2001-274742A, JP2004-32804A and JP2010-141447A, the increase in noise due to a 3-D TV phone apparatus is not considered, and the above problem cannot be solved.

SUMMARY OF THE INVENTION

The object of the present invention is to provide a TV phone apparatus capable of solving a problem in which communication is easily disconnected, and a control method therefor.

In order to achieve the above object, the TV phone apparatus according to the present invention is provided with a communication section, multiple image-taking sections, a voice input section and a control section.

The communication section performs transmission and reception of communication data.

The multiple image-taking sections take multiple moving images with different parallaxes and output multiple pieces of moving image data.

The voice input section acquires voice and outputs voice data.

The control section transmits the multiple pieces of moving image data and the voice data via the communication section, and, when the reception quality of the communication data becomes equal to or below a reference value, stops at least one of the multiple image-taking sections to stop transmission of at least one of the multiple pieces of moving image data.

According to the above invention, it becomes possible to prevent communication from being easily disconnected. The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 1:
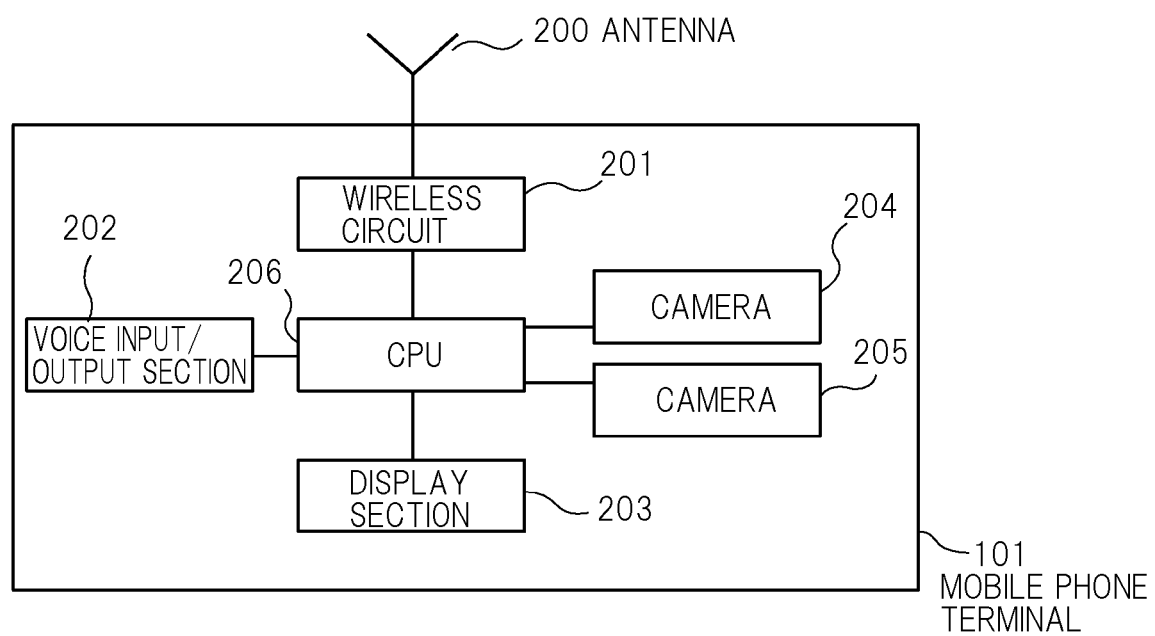
FIG. 1 is a block diagram showing a configuration of a mobile phone terminal that is a first exemplary embodiment.

Exemplary embodiments will be described below with reference to drawings. In the description below, those having the same function are given the same reference numeral, and description thereof may be omitted.

FIG. 1 is a block diagram showing a configuration of mobile phone terminal 101 that is a first exemplary embodiment. Mobile phone terminal 101 is a mobile terminal with a 3-D TV phone function, and it is provided with antenna 200, wireless circuit 201, voice input/output section 202, display section 203, cameras 204 and 205, and CPU 206.

Antenna 200 performs transmission and reception of radio waves with a wireless base station not shown.

Wireless circuit 201 is a communication section that wirelessly performs transmission and reception of communication data via antenna 200. More specifically, wireless circuit 201 has a function of demodulating received data, which is communication data received via antenna 200, and outputting it to CPU 206, and a function of modulating transmitted data, which is communication data from CPU 206, and transmitting it via antenna 200.

The communication data is assumed to include at least voice data. The communication data may also include video image data. As video image data, there are 3-D video image data indicating a 3-D video image and 2-D video image data indicating a 2-D plane video image. The 3-D video image data is constituted by multiple pieces of moving image data indicating multiple moving images with different parallaxes, and the 2-D video image data is constituted by a single piece of moving image data.

Voice input/output section 202 has a function as a voice input section that acquires voice and outputs it to CPU 206 as voice data, and a function as a voice output section that outputs voice data from CPU 206 as voice.

Display section 203 is, for example, an LCD (Liquid Crystal Display), and it displays various information.

Cameras 204 and 205 are image-taking sections that take moving images with different parallaxes and output moving image data to CPU 206. As for the number of cameras, in actuality, multiple cameras can exist, though only two cameras are shown in FIG. 1.

CPU 206 is a control section that reads a program from a computer-readable recording medium not shown and realizes the following functions by executing the read program.

When accepting received data from wireless circuit 201, CPU 206 outputs voice data included in the received data to voice input/output section 202 and outputs voice indicated by the voice data from voice input/output section 202. Then, CPU 206 outputs video image data included in the received data to display section 203 to display a video image indicated by the video image data, on display section 203.

Here, CPU 206 displays a 3-D video image if the video image data is 3-D video image data and displays a 2-D video image if the video image data is 2-D video image data. As a display system for displaying a 3-D video image, an eyeglass system may be adopted in which multiple pieces of moving image data in 3-D video image data are displayed in turn so that a user wearing eyeglasses for 3-D images, such as liquid crystal shutter eyeglasses, can visually confirm a 3-D stereoscopic video image, or other display systems may be adopted.

CPU 206 measures the reception quality of received data accepted from wireless circuit 201 and judges whether or not the reception quality is equal to or below a predetermined reference value. Hereinafter, it is assumed that the reception level is used as the reception quality. The reception level means RSCP (Received Signal Code Power: desired wave reception power) or RSSI (Received Signal Strength Indicator: received signal strength). The reception quality is not limited to the reception level. It may be CN ratio (Carrier to Noise ratio) or MER (Modulation Error Ratio).

If the reception level is above the reference value, CPU 206 causes voice input/output section 202 and cameras 204 and 205 to operate to accept voice data from voice input/output section 202 and accept 3-D video image data constituted by two pieces of moving image data from cameras 204 and 205. Then, CPU 206 transmits communication data including the voice data and the 3-D video image data, to the phone apparatus of a phone conversation counterpart via wireless circuit 201 and antenna 200. In this case, a phone conversation is carried out in the 3-D TV phone mode that is used for carrying out a phone conversation during which the user sees a 3-D video image.

On the other hand, if the reception level is equal to or below the reference value, CPU 206 stops at least one of cameras 204 and 205 to stop transmission of at least one of the two pieces of moving image data.

In this exemplary embodiment, it is assumed that, if the reception level is equal to or below the reference value, CPU 206 stops the operation of one of cameras 204 and 205 to stop transmission of one of the two pieces of moving image data. In this case, the voice data and 2-D video image data, which is a single piece of moving image data, are transmitted to the phone apparatus of the phone conversation counterpart, and a phone conversation is carried out in the 2-D TV phone mode that is used for carrying out a phone conversation during which the user sees a 2-D video image.

CPU 206 may perform image processing, such as resolution conversion, on the moving image data before transmitting the voice data and the moving image data.

Next, the operation of mobile phone terminal 101 will be described.

Figure 2:
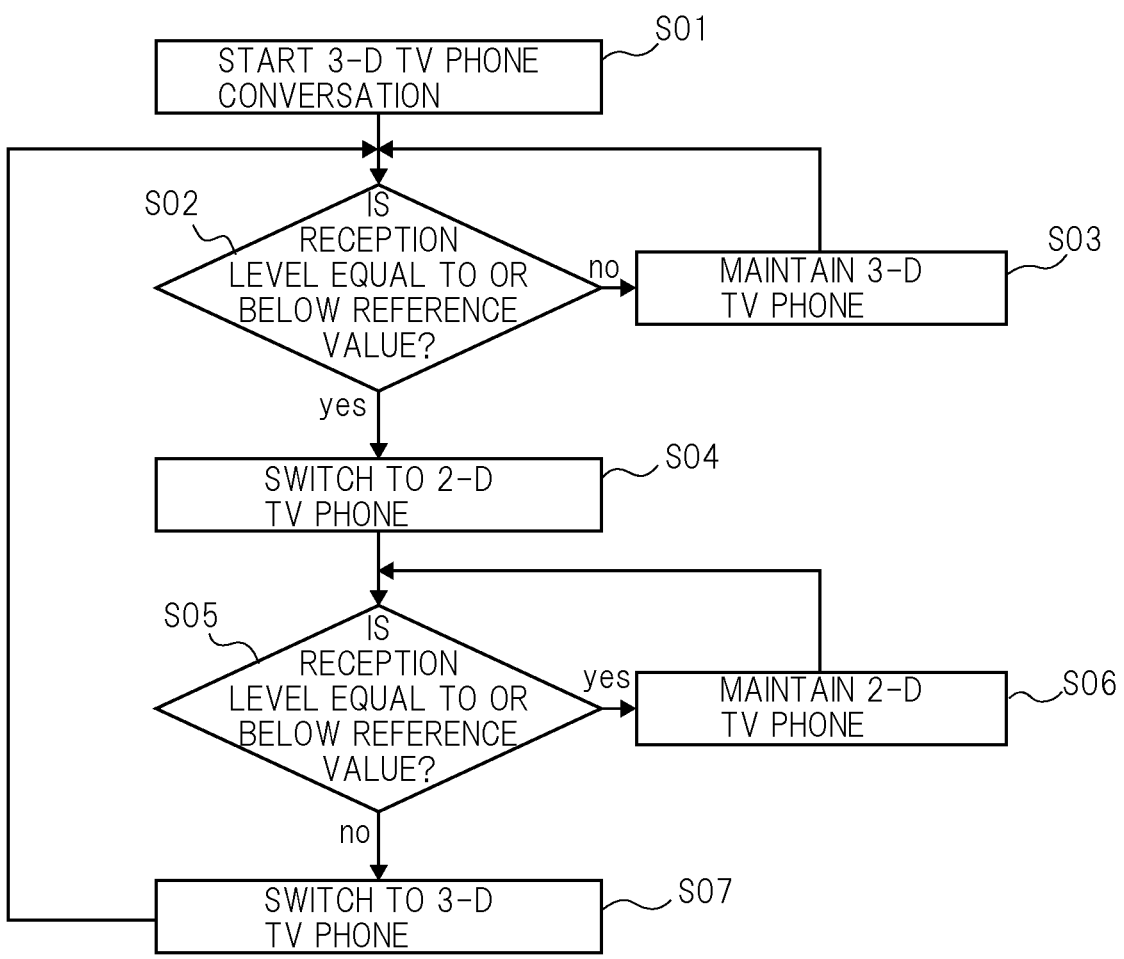
FIG. 2 is a flowchart for illustrating an example of the operation of the mobile phone terminal.

FIG. 2 is a flowchart for illustrating an example of the operation of mobile phone terminal 101.

First, when a user responds to an incoming call from a phone conversation counterpart or when the phone conversation counterpart responds to an outgoing call from the user, a call conversation in the 3-D TV phone mode is started (step S01). In the 3-D TV phone mode, CPU 206 causes voice input/output section 202 and cameras 204 and 205 to operate to accept voice data from voice input/output section 202 and to accept moving image data from each of cameras 204 and 205. CPU 206 creates communication data including 3-D video image data constituted by the two pieces of moving image data and the voice data and transmits it to the phone terminal of the phone conversation counterpart via wireless circuit 201 and antenna 200.

Next, CPU 206 measures the reception level of received data accepted from wireless circuit 201 and judges whether or not the reception level is equal to or below a reference value (step S02).

If the reception level is above the reference value, CPU 206 maintains the phone conversation in the 3-D TV phone mode (step S03) and returns to the processing of step S02 after a predetermined period.

On the other hand, if the reception level is equal to or below the reference value, CPU 206 switches the phone conversation mode from the 3-D TV phone mode to the 2-D TV phone mode (step S04). More specifically, CPU 206 stops the operation of one of cameras 204 and 205 to accept only one piece of moving image data from camera 204 or 205. CPU 206 creates communication data including 2-D video image data, which is the accepted moving image data, and the voice data and transmits it to the phone terminal of the phone conversation counterpart via wireless circuit 201 and antenna 200.

If, after the phone conversation mode is switched to the 2-D TV phone mode, the multiple pieces of moving image data are included in received data received by wireless circuit 201, CPU 206 may output only one of the multiple pieces of moving image data to display section 203 to display a 2-D plane image and discard the other pieces of moving image data.

When a predetermined period elapses after the phone conversation mode is switched to the 2-D TV phone mode, CPU 206 measures the reception level of received data accepted from wireless circuit 201 and judges whether or not the reception level is equal to or below the reference value (step S05).

If the reception level is equal to or below the reference value, CPU 206 maintains the phone conversation in the 2-D TV phone mode (step S06) and returns to the processing of step S05 after a predetermined period.

On the other hand, if the reception level is above the reference value, CPU 206 activates camera 204 or 205 the operation of which has been stopped in step S04 to switch the phone conversation mode from the 2-D TV phone mode to the 3-D TV phone mode (step S07) and returns to step S02 after a predetermined period.

Figure 3:
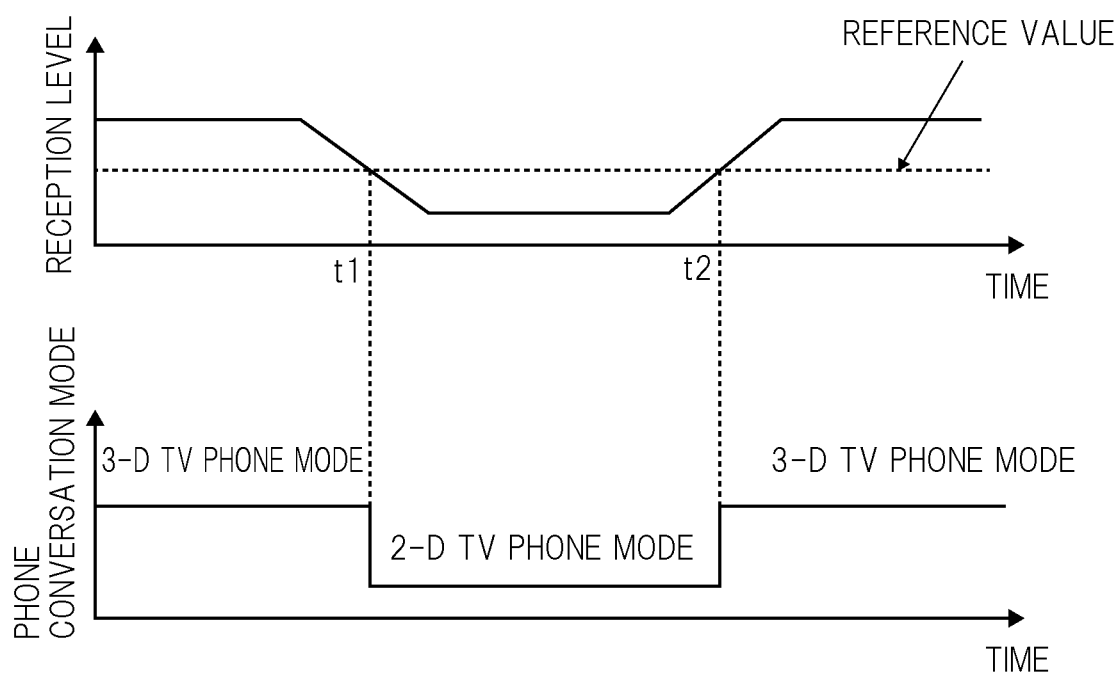
FIG. 3 is a time chart for illustrating an example of transition of the phone conversation mode of the mobile phone terminal.

FIG. 3 is a time chart for illustrating an example of transition of the phone conversation mode of mobile phone terminal 101. In FIG. 3, it is assumed that a phone conversation in the 3-D TV phone mode is made, and the reception level decreases with lapse of time and then increases.

The phone conversation in the 3-D TV phone mode is made, and at time t1 when the reception level becomes equal to or below the reference value, CPU 206 switches the phone conversation mode from the 3-D TV phone mode to the 2-D TV phone mode. After that, the reception level increases with the lapse of time. At time t2 when the reception level goes above the reference value, CPU 206 switches the phone conversation mode from the 2-D TV phone mode to the 3-D TV phone mode.

As described above, according to this exemplary embodiment, wireless circuit 201 performs transmission and reception of communication data. Cameras 204 and 205 take two moving images with different parallaxes and output two pieces of moving image data. Voice input/output section 202 acquires voice and outputs voice data. CPU 206 transmits multiple pieces of moving image data and voice data via wireless circuit 201, and, when the reception level of communication data becomes equal to or below a reference value, stops at least one of cameras 204 and 205 to stop transmission of at least one of the multiple pieces of moving image data.

In this case, when the reception level becomes equal to or below the reference value, at least one of cameras 204 and 205 is stopped to stop transmission of at least one of the multiple pieces of moving image data. Therefore, since the number of operating cameras and the number of pieces of moving image data to be image-processed is decreased if the reception level is equal to or below the reference value, it becomes possible to reduce the amount of the operation of internal devices such as the cameras and CPU 206. Accordingly, noise caused in the internal devices is also reduced, and it becomes possible to prevent communication from being easily disconnected. Furthermore, since it becomes possible to reduce the amount of the operation of the internal devices, it becomes possible to reduce power consumption.

Furthermore, in this exemplary embodiment, if the reception level is equal to or below the reference value, CPU 206 stops the operation of one of cameras 204 and 205 to stop transmission of one of two pieces of moving image data outputted from cameras 204 and 205. In other words, CPU 206 stops all of cameras 204 and 205 except for one of them to stop transmission of all of the two pieces of moving image data except for one of them. Therefore, it becomes possible to, if the reception level is equal to or below the reference value, switch the phone conversation mode from the 3-D TV phone mode to the 2-D TV phone mode, and it becomes possible to prevent communication from being easily disconnected.

Next, a second exemplary embodiment will be described.

In the first exemplary embodiment, the 3-D TV phone mode and the 2-D TV phone mode are used as phone conversation modes. In this exemplary embodiment, a voice phone conversation mode is further used as a phone conversation mode in addition to the 3-D TV phone mode and the 2-D TV phone mode.

More specifically, if the reception level is above a reference value (referred to as first reference value P1 in this exemplary embodiment), CPU 206 transmits communication data including voice data and two pieces of moving image data via wireless circuit 201 and antenna 200. In this case, a phone conversation in the 3-D TV phone mode is made.

If the reception level is equal to or below first reference value P1 and above second reference value P2, CPU 206 stops the operation of one of cameras 204 and 205 to stop transmission of one of the two pieces of moving image data. In this case, a phone conversation in the 2-D TV phone mode is made. Second reference value P2 is a value smaller than first reference value P1.

If the reception level is below second reference value P2, CPU 206 stops the operation of both of cameras 204 and 205 to stop transmission of both of the two pieces of moving image data. In this case, CPU 206 transmits only the voice data as communication data via wireless circuit 201 and antenna 200, and a phone conversation in the voice phone conversation mode is carried out during which the user is not able to see any video image.

Figure 4:
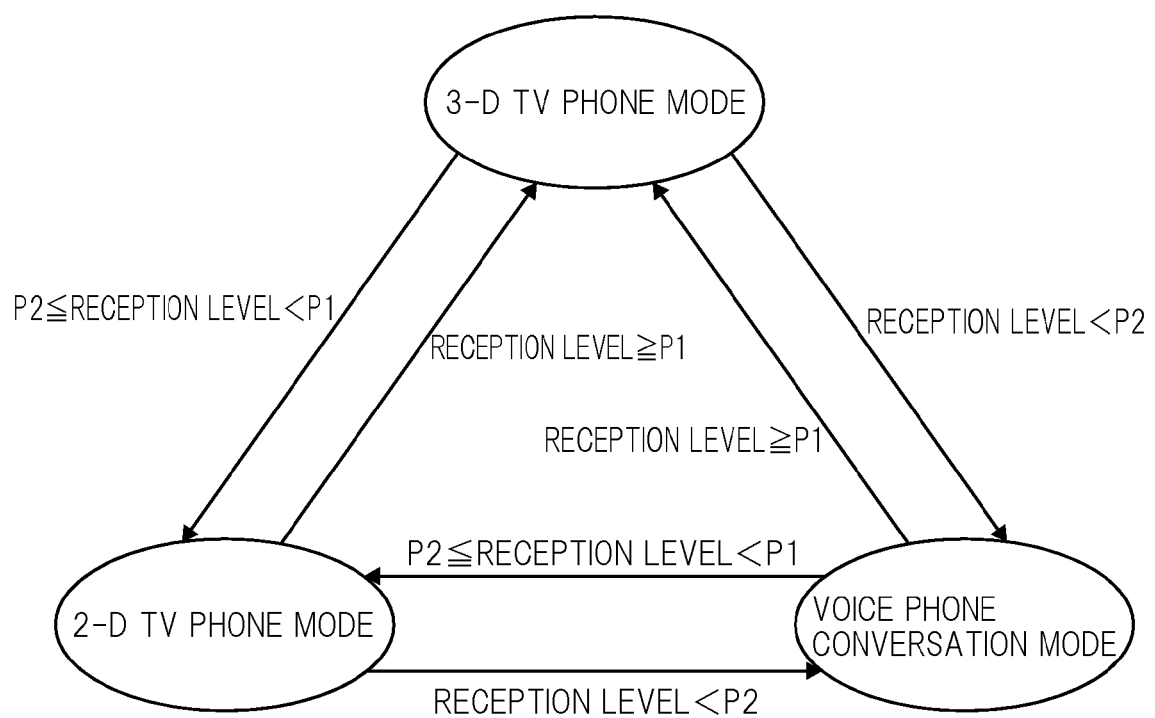
FIG. 4 is a diagram for illustrating another example of transition of the phone conversation mode of the mobile phone terminal.

FIG. 4 is a transition diagram of the phone conversation mode in the case of switching among the 3-D TV phone mode, the 2-D TV phone mode and the voice phone conversation mode according to the reception level. In this exemplary embodiment, CPU 206 switches the phone conversation mode by comparing the reception level of received data received by wireless circuit 201 with each of the first reference value and the second reference value at predetermined period intervals. Specifically, the phone conversation mode is switched to the 3-D TV phone mode if the reception level is above first reference value P1, switched to the 2-D TV phone mode if the reception level is equal to or below first reference value P1 and above second reference value P2, and switched to the voice phone conversation mode if the reception level is equal to or below second reference value P2.

Figure 5:
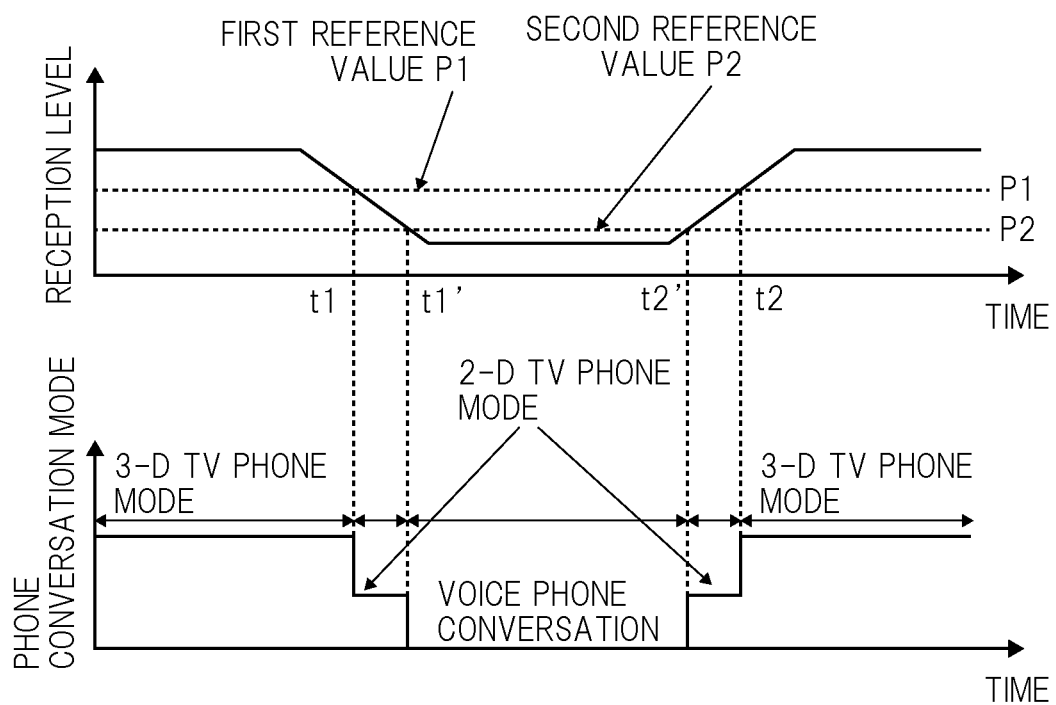
FIG. 5 is a time chart for illustrating another example of transition of the phone conversation mode of the mobile phone terminal.

FIG. 5 is a time chart for illustrating an example of transition of the phone conversation mode of mobile phone terminal 101 in this exemplary embodiment. In FIG. 5, similarly to the case of FIG. 3, it is assumed that a phone conversation in the 3-D TV phone mode is made, and the reception level decreases with the lapse of time and, after that, increases.

The phone conversation in the 3-D TV phone mode is made, and at time t1 when the reception level becomes equal to or below the reference value, CPU 206 switches the phone conversation mode from the 3-D TV phone mode to the 2-D TV phone mode. After that, the reception level further decreases with the lapse of time. At time t1' when the reception level becomes equal to or below second reference value P2, CPU 206 switches the phone conversation mode from the 2-D TV phone mode to the voice phone conversation mode.

After that, the reception level increases with the lapse of time. At time t2' when the reception level goes above second reference value P2, CPU 206 switches the phone conversation mode from the voice phone conversation mode to the 2-D TV phone conversation mode. Then, the reception level further increases with lapse of time. At time t2 when the reception level goes above first reference value P1, CPU 206 switches the phone conversation mode from the 2-D TV phone mode to the 3-D TV phone mode.

As described above, according to this exemplary embodiment, it becomes possible to minutely switch the phone conversation mode according to the reception level, and, therefore, it becomes possible to more efficiently prevent communication from being easily disconnected, in consideration of the convenience of the user.

FIGS. 4 and 5 show a case where the reception level fluctuates relatively slowly. However, if the reception level abruptly changes from the state of being above first reference value P1 to the state of being equal to or below second reference value P2 or from the state of being equal to or below second reference value P2 to the state of being above first reference value P1 within a predetermined period, then CPU 206 may switch the phone conversation mode between the 3-D TV phone mode and the voice phone conversation mode without performing switching to the 2-D TV phone mode. In this case, even when the reception level abruptly changes, it is possible to prevent communication from being easily disconnected.

Next, a third exemplary embodiment will be described.

In this exemplary embodiment, if the reception level is equal to or below a reference value, CPU 206 switches transmission of moving image data to the transmission of still image data. In this exemplary embodiment, the 3-D TV phone mode is called a 3-D moving image mode.

Figure 6:
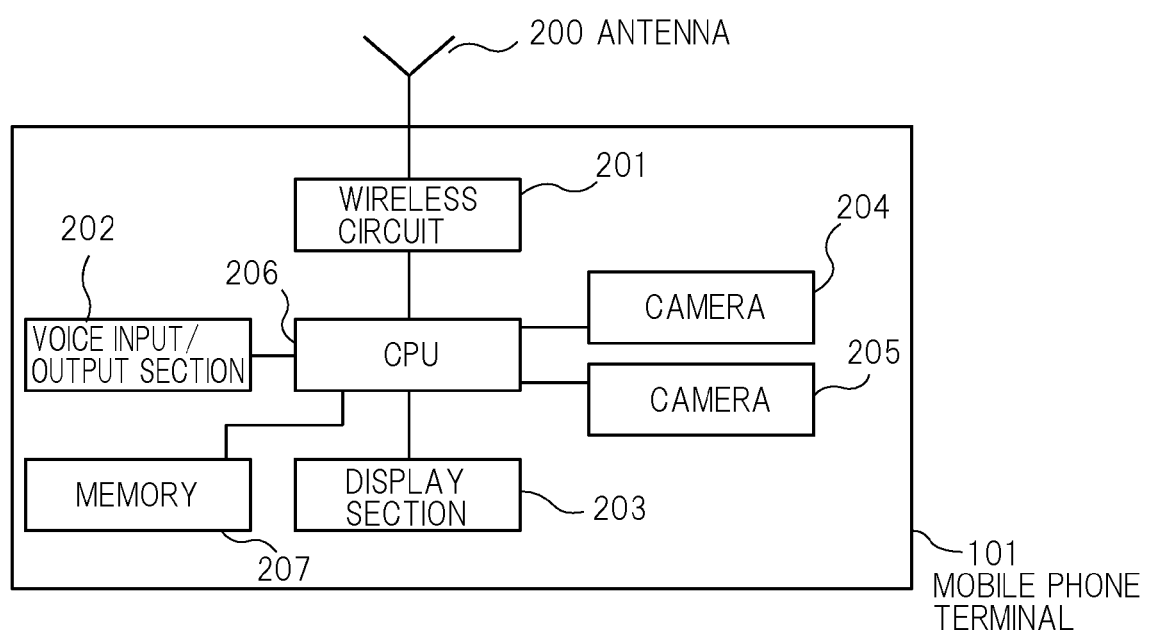
FIG. 6 is a block diagram showing a configuration of a mobile phone terminal that is a third exemplary embodiment.

FIG. 6 is a block diagram showing a configuration of mobile phone terminal 101 of this exemplary embodiment. In FIG. 6, mobile phone terminal 101 is provided with memory 207 in addition to the configuration shown in FIG. 1.

Memory 207 is a recording section that records various information. Memory 207 may be used as a recording medium for recording a program specifying the operation of CPU 206.

If the reception level of received data received by wireless circuit 201 is equal to or below the reference value, CPU 206 stops the operation of both of cameras 204 and 205, and extracts still image data from each of moving image data outputted from cameras 204 and 205 before the stop. For example, CPU 206 extracts a predetermined frame in the moving image data as the still image data. As the predetermined frame, the last frame in the moving image data is desirable.

CPU 206 records each still image data extracted from each moving image data into memory 207.

CPU 206 repeatedly transmits the still image data recorded in memory 207 together with voice data as communication data at the frame rate of the moving image data via wireless circuit 201 and antenna 200.

Figure 7:
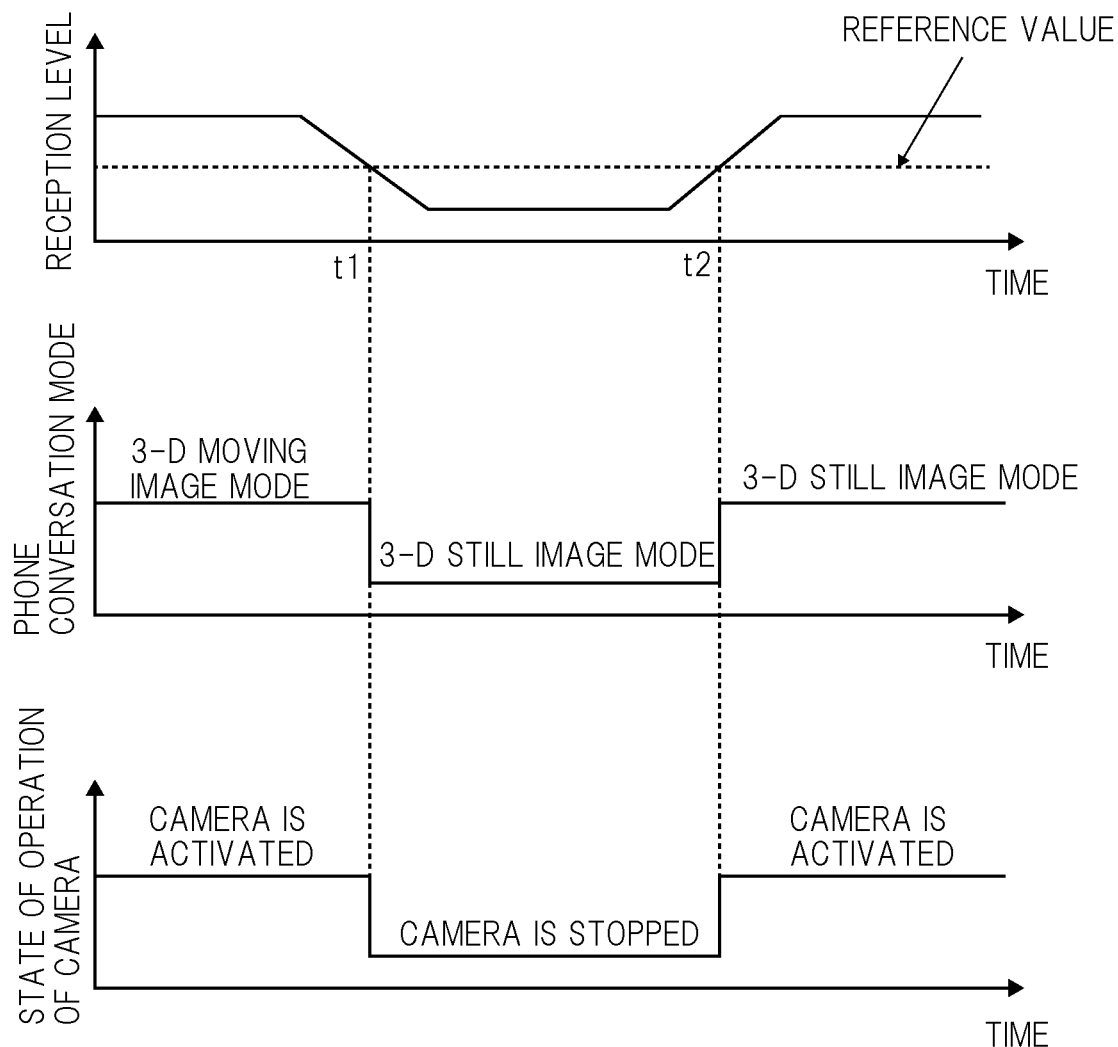
FIG. 7 is a time chart for illustrating another example of transition of the phone conversation mode of the mobile phone terminal.

FIG. 7 is a time chart for illustrating an example of transition of the phone conversation mode of mobile phone terminal 101 and the state of the operation of cameras 204 and 205. In FIG. 7, similarly to FIG. 3, it is assumed that a phone conversation in the 3-D moving image mode is made, and the reception level decreases with the lapse of time and, after that, increases.

A phone conversation in the 3-D TV moving image mode is made, and, at time t1 when the reception level becomes equal to or below the reference value, CPU 206 stops the operation of cameras 204 and 205, extracts still image data from each moving image data and records it onto memory 207, and then switches the phone conversation mode from the 3-D moving image mode to a 3-D still image mode of transmitting still image data that is stored in memory 207. After that, at time t2 when the reception level becomes equal to or above the reference value, CPU 206 activates cameras 204 and 205 and switches the phone conversation mode from the 3-D still image mode to the 3-D moving image mode.

Figure 8:
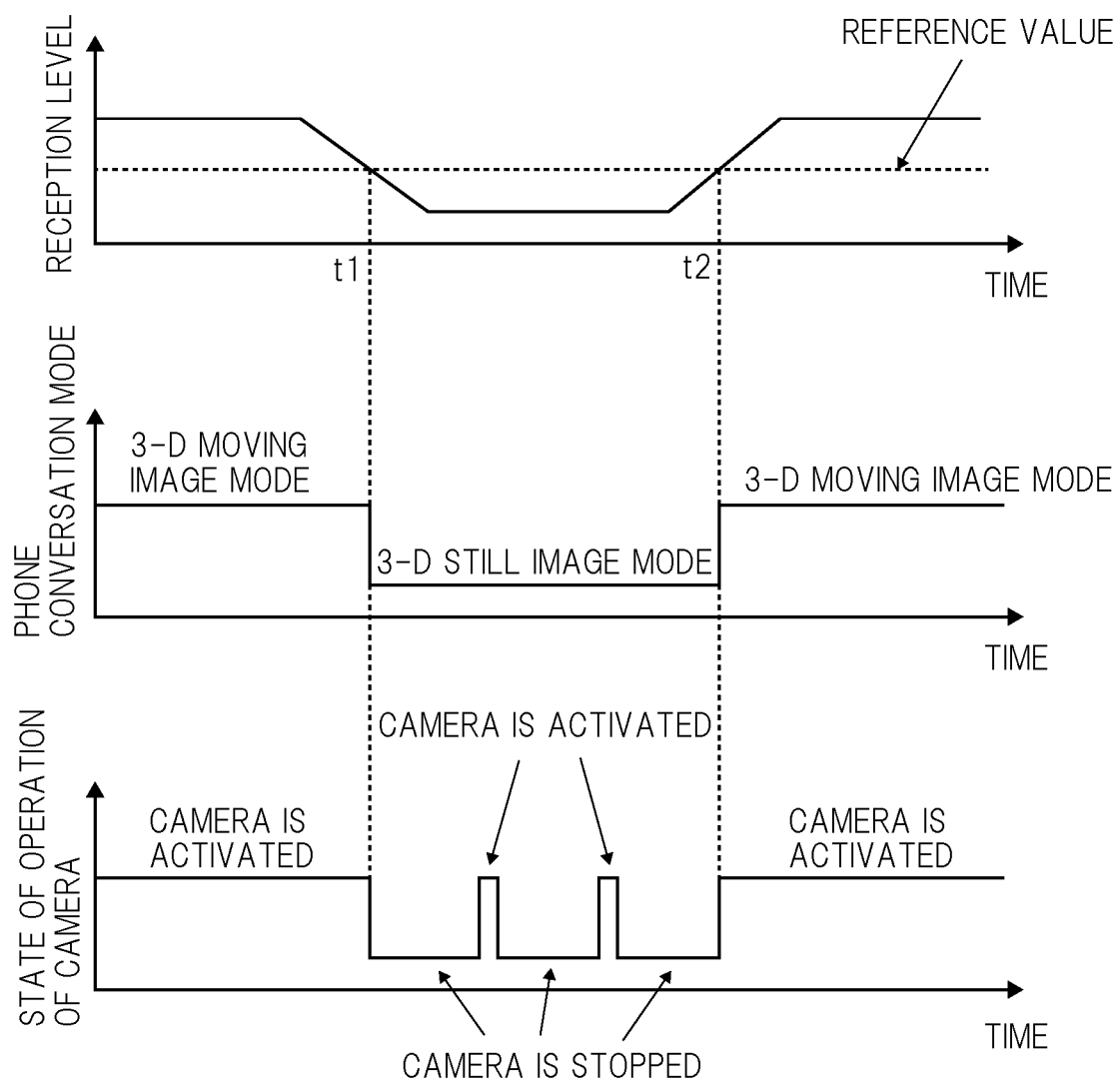
FIG. 8 is a time chart for illustrating another example of transition of the phone conversation mode of the mobile phone terminal.

If cameras 204 and 205 are provided with the still image mode of taking still images with different parallaxes and outputting still image data, CPU 206 may, when the reception level is equal to or below the reference value as shown in FIG. 8, activate cameras 204 and 205 in the still image mode to cause them to take a still image at predetermined period intervals. In this case, CPU 206 updates still image data to be transmitted to a phone conversation counterpart by updating the still image data in memory 207 according to still image data outputted from cameras 204 and 205 at the time of the activation. At this time, CPU 206 may convert the number of pixels of the still image data outputted from cameras 204 and 205 to the number of pixels of moving image data.

As described above, according to this exemplary embodiment, when the reception level becomes equal to or below a reference value, the display image on a phone apparatus merely changes from a 3-D moving image to a 3-D still image. Therefore, Therefore, it is possible to prevent the user from becoming irritated when the displayed video image is changed from 3-D to 2-D mode and the displayed video image is disappearance.

Furthermore, in this exemplary embodiment, when the reception level is equal to or below the reference value, a still image transmitted to a phone conversation counterpart is periodically updated. Therefore, it is possible to cause a phone conversation in the 3-D moving image mode to appear as if it were continued in a state in which the frame rate of a moving image has decreased.

Since cameras 204 and 205 are activated when a still image is updated, the amount of noise caused from internal devices increases in a moment. However, since the time during which the amount of noise increases is short, there is not much effect on the state of communication and it is possible to prevent a state of communication from being easily disconnected.

In each of the exemplary embodiments described above, the illustrated configuration is a mere example, and the present invention is not limited to the configuration.

For example, though the 3-D TV phone terminal of the present invention is realized by a mobile phone terminal in each exemplary embodiment, the 3-D TV phone terminal of the present invention may be realized by a fixed phone terminal or an IP phone terminal.

What is claimed is:

1. A TV phone apparatus comprising: a communication section that performs transmission and reception of communication data;
   multiple image-taking sections that take multiple moving images with different parallaxes and output multiple pieces of moving image data;
   a voice input section that acquires voice and outputs voice data; and
   a control section that transmits the multiple pieces of moving image data and the voice data via said communication section, and, when reception quality of the communication data changes to become equal to or below a reference value, stops at least one of said multiple image-taking sections to stop transmission of at least one of the multiple pieces of moving image data;
   wherein if the reception quality is equal to or below the reference value, said control section stops said multiple image-taking sections except for one section and stops transmission of the multiple pieces of moving image data except for one piece.

2. The TV phone apparatus according to claim 1, wherein if the reception quality is equal to or below the reference value and above a second reference value that is smaller than the reference value, said control section stops said multiple image-taking sections except for one section and stop transmission of the multiple pieces of moving image data except for one piece, and, if the reception quality is equal to or below the second reference value, stops all of said multiple image-taking sections to stop transmission of all the multiple pieces of moving image data.

3. A TV phone apparatus comprising: a communication section that performs transmission and reception of communication data;
   multiple image-taking sections that take multiple moving images with different parallaxes and output multiple pieces of moving image data;
   a voice input section that acquires voice and outputs voice data; and
   a control section that transmits the multiple pieces of moving image data and the voice data via said communication section, and, when reception quality of the communication data changes to become equal to or below a reference value, stops at least one of said multiple image-taking sections to stop transmission of at least one of the multiple pieces of moving image data;
   wherein:
      if the reception quality is equal to or below the reference value, said control section stops all of said multiple image-taking sections to stop transmission of all the multiple pieces of moving image data; and
      if the reception quality is equal to or below the reference value, said control section extracts still image data from each piece of moving image data outputted from each image-taking section before the stop, records the still image data into said recording section, and repeatedly transmits each of the recorded pieces of still image data via said communication section.

4. The TV phone apparatus according to claim 3, wherein said image-taking sections are provided with a still image mode of taking multiple still images with different parallaxes and outputting the still images as multiple pieces of second still image data; and
   if the reception quality is equal to or below the reference value, said control section periodically activates said image-taking sections in the still image mode and updates each piece of still image data in said recording section according to each piece of second still image data outputted at the time of the activation.

5. A control method for a TV phone apparatus that comprises a communication section that performs transmission and reception of communication data;
   multiple image-taking sections that take multiple moving images with different parallaxes and output multiple pieces of moving image data; and a voice input section that acquires voice and outputs voice data, wherein
      the multiple pieces of moving image data and the voice data are transmitted via said communication section; and
      when reception quality of the communication data changes to become equal to or below a reference value, at least one of said multiple image-taking sections is stopped to stop transmission of at least one of the multiple pieces of moving image data;
      wherein if the reception quality is equal to or below the reference value, said TV phone apparatus stops said multiple image-taking sections except for one section and stops transmission of the multiple pieces of moving image data except for one piece.

6. A control method for a TV phone apparatus that comprises a communication section that performs transmission and reception of communication data; multiple image-taking sections that take multiple moving images with different parallaxes and output multiple pieces of moving image data; and a voice input section that acquires voice and outputs voice data, wherein
   the multiple pieces of moving image data and the voice data are transmitted via said communication section; and
   when reception quality of the communication data changes to become equal to or below a reference value, at least one of said multiple image-taking sections is stopped to stop transmission of at least one of the multiple pieces of moving image data;
   wherein:
      if the reception quality is equal to or below the reference value, said TV phone apparatus stops all of said multiple image-taking sections to stop transmission of all the multiple pieces of moving image data; and
      if the reception quality is equal to or below the reference value, said TV phone apparatus extracts still image data from each piece of moving image data outputted from each image-taking section before the stop, records the still image data into a recording section, and repeatedly transmits each of the recorded pieces of still image data via said communication section.

* * * * *